No. 818,771. PATENTED APR. 24, 1906.
H. MAERKER.
TIRE FOR WHEELS.
APPLICATION FILED AUG. 28, 1905.

WITNESSES:
Fr. Scheibert.
Max Rinsch.

INVENTOR
H. Maerker
by J. A. Hoppman
ATTORNEY

UNITED STATES PATENT OFFICE.

HANS MAERKER, OF WIESBADEN, GERMANY.

TIRE FOR WHEELS.

No. 818,771.

Specification of Letters Patent.

Patented April 24, 1906.

Application filed August 28, 1905. Serial No. 276,071.

*To all whom it may concern:*

Be it known that I, HANS MAERKER, engineer, a subject of the King of Prussia, German Emperor, residing at Wiesbaden, Leberberg 8, in the Kingdom of Prussia, German Empire, have invented new and useful Improvements in Tires for Wheels, of which the following is a specification.

This invention has for its object a tire for the wheels of bicycles, motor-cycles, and motor-cars.

In the wheel-tires hitherto employed the elasticity, which is a necessary condition for a steady pleasant running or traveling, is obtained by india-rubber or pneumatic tires, which, however, have many drawbacks, owing to their being easily damaged. In addition to this pneumatic tires are liable to great wear and tear, which renders them very expensive.

The object of the present application removes these drawbacks and affords by reason of its very easy removability and cheapness, combined with practically unlimited durability, the best substitute for pneumatic tires.

The principal advantage, as compared with other elastic or resilient tires, becomes evident more particularly in long tours. If, for instance, any damage by glass, stones, nails, and the like is found in a pneumatic tire, the latter requires a troublesome repairing, absorbing a long time. Even this is frequently out of the question, and then the air-tube and outer cover has to be entirely replaced. In this improved wheel-tire, on the other hand, only the damaged steel segment need be replaced by a fresh one, which may easily be carried in the pocket by any cyclist or motorist.

The metal pieces employed in these improved wheel-tires are made of cast steel, aluminium, and other like metals or their alloys.

An arrangement of this character is shown as an example and diagrammatically in the accompanying drawings, in which—

Figure 1:
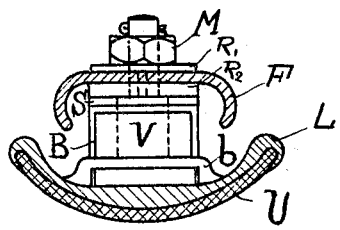
Figure 2:
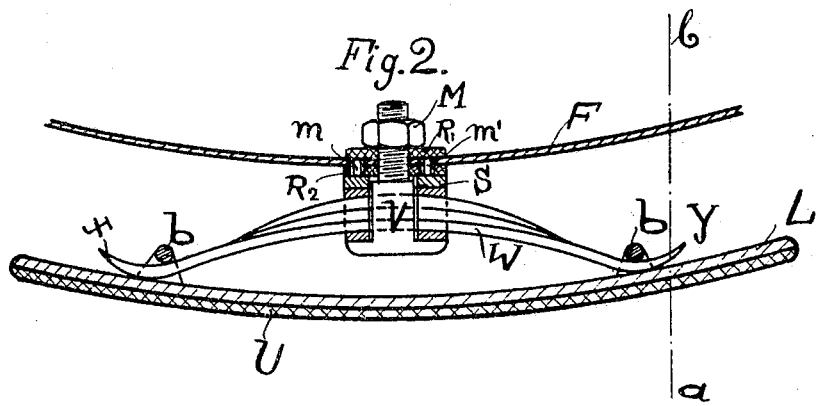
Figure 3:
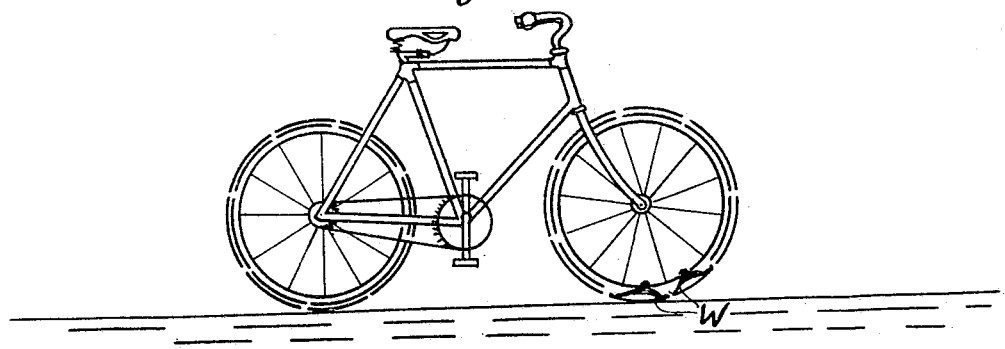

Figure 1 is a vertical section on the line *a b* of Fig. 2, and Fig. 2 a vertical section seen from the side, while Fig. 3 shows the arrangement applied to a bicycle.

The arrangement of this improved wheel-tire is substantially as follows: On the inner rim F, held fast by the spokes, a spring W is mounted, the ends $x$ $y$ of which hold with small play in two yokes $b$ a steel segment L, in which a linoleum or other suitably-composed insertion U is introduced for the purpose of deadening the noise. A rectangular pin V is passed through the block B of the spring W, which pin is attached to the rim F by means of a nut locked by a pin, so that the spring W is connected with the rim F as a rigid whole. The rectangular pin is secured against turning by means of a washer-disk S, which is placed over the projecting part of the pin and has two pegs $m$ and $m'$, which engage in suitable holes in the rim. Two leather disks $R'$ $R^2$ are placed between the nut M and the washer S, respectively, and the rim F to prevent wear and to deaden noise.

Having now described my invention, what I wish to secure by Letters Patent of the United States is—

1. In an elastic tire for wheels, in which the elastic tire proper is composed of a plurality of separate segments and of a like number of carriage-springs, each of which has its ends connected with one of said segments, and its middle portion secured to the inner or rigid tire of the wheel, the combination with each segment and its appurtenant spring, of yokes $b$ $b$ fixed to the inner side of the segment, and adapted to receive the ends of the spring, these ends being rebent outside of said yokes, and means adapted to prevent the spring with its segment from turning out of the plane of the wheel, said means being applied to the middle portion of the said spring, for the purpose as described.

2. In an elastic tire for wheels, in which the elastic tire proper is composed of a plurality of separate segments and of a like number of carriage-springs, each of which has its ends connected with one of said segments, and its middle portion secured to the inner or rigid tire of the wheel, the combination with each segment and its appurtenant spring, of yokes $b$ $b$ fixed to the inner side of the segment, and adapted to receive the ends of the spring, these ends being rebent outside of the yokes; a hole of rectangular shape provided in said spring; a bolt V having part of its shaft of the same section located in said hole; another hole provided in the inner rim and adapted to receive the screw-threaded portion of the bolt-shaft; a washer-disk S located between the inner rim and the spring and taking over the rectangular portion of said bolt, pins $m$ $m'$ secured to said washer-disk and taking into a suitably-provided portion of the inner rim, and a nut M screwed upon the inwardly-projecting end of the said bolt, substantially and for the purpose as described.

In witness whereof I have hereunto set my hand in presence of two witnesses.

HANS MAERKER.

Witnesses:
  EMIL BUERWALD,
  ROBERT VOLLMANN.